June 22, 1965  JYUNICHI GOTO  3,190,572

COFFEE GRANULATING APPARATUS

Filed July 15, 1963  2 Sheets-Sheet 1

INVENTOR.
Jyunichi Goto
BY Wenderoth, Lind
and Ponack, attys

June 22, 1965  JYUNICHI GOTO  3,190,572

COFFEE GRANULATING APPARATUS

Filed July 15, 1963  2 Sheets-Sheet 2

INVENTOR.
Jyun ichi Goto

United States Patent Office 3,190,572
Patented June 22, 1965

3,190,572
COFFEE GRANULATING APPARATUS
Jyunichi Goto, 519 Ohmiya, Fujimiya, Japan
Filed July 15, 1963, Ser. No. 295,030
Claims priority, application Japan, July 20, 1962,
37/29,856
1 Claim. (Cl. 241—235)

The present invention relates to a method and apparatus for granulating dry food stock.

In the conventional method for the manufacture of a granular food of high aroma, such as, coffee, and other granular food products, the destruction of a cell, a construction unit of food, is inevitable due to the friction of impact as well as difference of revolving speed of cracking steel rolls and the simultaneous occurrence of static electricity and heat resulting from the above friction of the same steel rolls. It may be said that the natural flavor and aroma of granular food products have been deteriorated to a considerable degree. However, it seems that research on the phenomena for the degradation of food quality and how to prevent them have never been satisfactorily carried out.

In the present days devoted to the consumers based on "better products for better living," unfortunately, the quality of granular food has hardly made any noticeable progress. The improvement of food quality seems to be one of the subtle and delicate problems still to be solved. With a view to improving the quality of granular food, I have already obtained two U.S. patents, U.S. Pat. No. 2,981,480, entitled, "Low pressure flour mill," granted April 28, 1961 and No. 3,039,704, "Granulating apparatus," granted June 19, 1962. They are directed to the improvement of granular food quality by my method of granulating or grinding. The formed relates to the wheat flour and the latter to the granular coffee in order to improve the quality thereof, respectively, and the object has been attained in practice.

However, I dare say it will be impossible to obtain a granular food of better quality than heretofore by the mill having recourse to cracking rolls made of steel. To overcome the above defects, the present invention contemplates to provide "Kasai" process for the manufacture of granular food. A Japanese word, "Kasai," is an abbreviation of a Japanese phrase, "each grain is divided at its center by a light strike as it spans as a bridge between two points."

Heretofore, the known friction-type grinding mill has been employed to obtain a food granule. By this oil mill, not only granules but also finely divided powders are produced simultaneously. It seems that the finely divided powders thus produced contain not only destroyed cells of food, but also an amount of enzymes which come out of the destroyed cells. In addition, it is also considered that the nature of granular food is considerably influenced by static electricity caused by friction. Therefore, the quality and freshness of granular food will be rapidly deteriorated.

A granular food is required so as to retain its aroma, flavor and freshness. However, the conventional flour mill is not suitable for the manufacture of granular food because of the reason described hereinabove. As is well known, the present day flour mill comprises a pair of break rolls consisting of corrugated steel cylinders and the coffee mill comprises a similar construction consisting of a slow speed circumferentially ribbed roll and a high speed oppositely driven longitudinally ribbed roll. The wheat berry or coffee bean is subjected to cracking caused by dual friction, impact and speed difference, which occurs between opposed rolls. Numerous types and varieties of mills, whether flour or coffee, have been proposed in the past, but they have been based on the principle of dual friction, therefore the occurrence of static electricity and destruction of cells are so inevitable that they should be unsuitable for the manufacture of granular food.

In view of the foregoing, the present invention contemplates to provide a "Kasai" method for granulating a dry food stock between a pair of granulating elements or rolls made of a bad conducting or insulating material for electricity, the surface of said rolls being provided with a plurality of circumferential ribs in the form of a triangle, the edge or point of each rib being hard, smooth and non-non-sharp, the size of each rib being smaller than each grain of the dry food stock, a plurality of selected ribs in a longitudinal direction being provided with a plurality of recesses in the same direction, the edge of each rib on a roll of a pair of opposed rolls being staggered so as to lie between a pair of adjacent ribs on the opposed rolls being not in direct contact with each other, the two edges of two ribs of opposed rolls being spaced from each other, and each of said rolls being driven at the same speed in different directions. This Kasai method is characterized in that neither static electricity nor destruction of cells nor heat will take place during the process for granulating the dry or roasted food stock.

A principal object of the invention, therefore, is to provide a method for the manufacture of food granules by the Kasai process in which the food granule comprising a number of cells is obtained by dividing the food stock along the cell or cells boundary so that the cell or cells will never be destroyed and any enzyme considered to be included in the cell will not come out.

Another object of the invention is to provide a method for the manufacture of coffee granules characterized by the non-evolution of a gas, such as, carbon dioxide when the freshly granulated coffee is packed in a can.

A further object of the invention is to provide a method for the manufacture of coffee granules characterized in that a coffee drink made by either drip or open pot method from the coffee granules of this invention will retain its aroma, flavor and taste for an extended period of time even after cooling to room temperature, therefore this coffee drink can be preserved in a can or bottle, which should be one of the unexpected advantages.

These and other objects, uses, and advantages of the invention will be apparent to those skilled in the art from the following description in connection with the accompanying drawings in which.

The principle of Kasai method is disclosed in U.S. Patent 3,039,704 granted to me described hereinbefore, but it should be noted that the present invention is different from the said patent as follows:

(1) A Venetian blind like granulating element is not used at one of a pair of opposed rolls at the first stage.

(2) A pair of opposed rolls is used at the first stage.

(3) A plurality of circumferential ribs on the pair of opposed rolls at the first stage are provided with a plurality of recesses.

(4) Each of the circumferential ribs is made of a hard dielectric material and the edge or point of the rib is formed so round and non-sharp that it may be called smooth.

(5) The edges or points of ribs of one roll lie on a straight line while those of ribs of the other roll lie on another straight line, and the two straight lines are spaced from each other by a predetermined distance.

Figure 2:
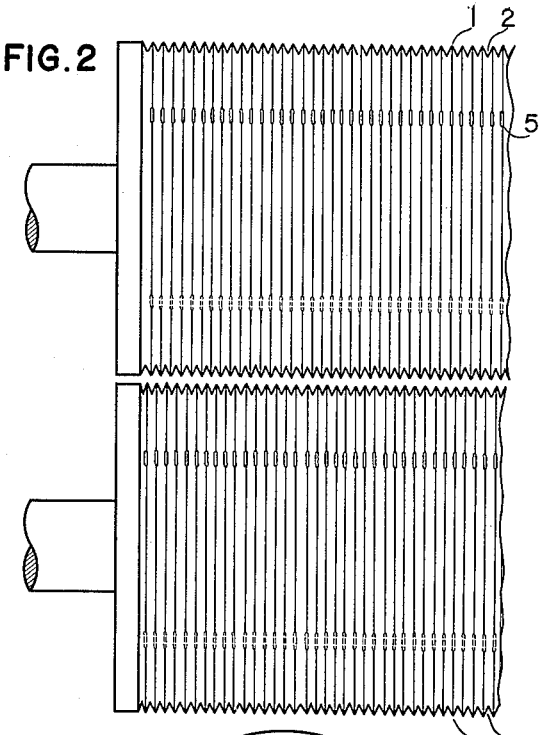
FIG. 2 is a front view of a pair of rolls with a number of circumferential ribs embodying the principle of the invention.
Figure 3:
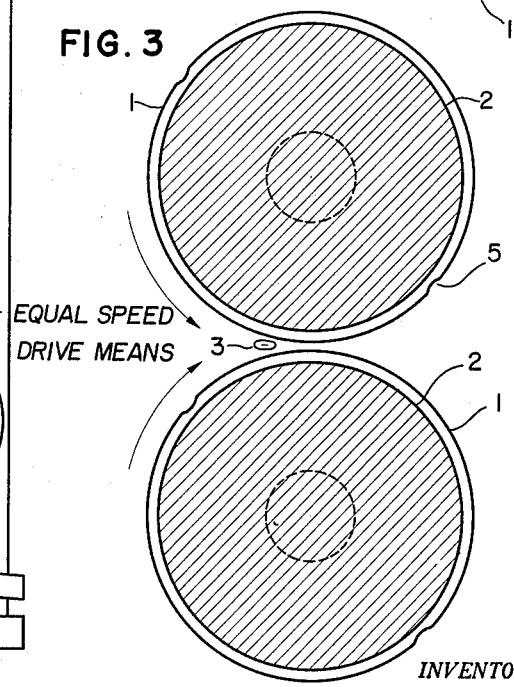
FIG. 3 is a side view of the rolls of FIG. 2.
Figure 4:
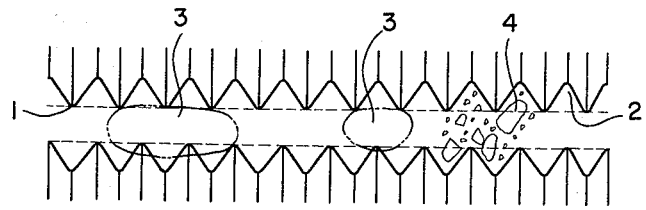
FIG. 4 is a plan view of the edges or points of ribs on an enlarged scale showing a first stage.

Referring to FIGS. 2–3, a pair of opposed rolls provided with a plurality of circumferential ribs 1 are driven at the same speed in different directions spaced from each other by a gap smaller than the size of a grain of dry food stock to be processed, the size of each rib being selected in such manner that it is smaller than each grain of the dry food stock in diameter, length and width, and each rib of the opposed granulating rolls is provided in staggered relation in the same plane. As shown in FIG. 4 on an enlarged scale, a grain of the dry food stock is subjected to being divided through the granulating rolls in such manner that each grain is divided as if spanning as a bridge between the edges of at least two ribs. As described hereinbefore, this granulating operation is called, "Kasai" in Japanese. As shown in FIG. 4, the round edge or point of each rib on a roll of a pair of opposed rolls is staggered so as to lie between a pair of adjacent ribs on the opposed roll so that the two round edges of two ribs of opposed rolls are not in direct contact with each other. Moreover, the ribs on each roll of a pair of opposed rolls extend toward the ribs on the opposed roll, but lie on a straight line. On the other hand, the other ribs on the other roll extend toward each other and lie on another straight line. There is a predetermined distance between the two straight lines.

As described hereinbefore, each rib is made of a hard dielectric material and the edge or point thereof is formed as round and non-sharp, the reason of which will be mentioned hereinafter. Furthermore, a series of ribs of the first pair of rolls in an axial direction are provided with a series of recesses 5 in the same direction, the size of which being one-third of the height between the round edge of the rib and the bottom of the same. If there is a particularly large bean in the stock to be processed, it is easily engaged into the recessed rib to be granulated. The series of recesses can dispense with the Venetian blind like element as used in the prior art. The provision of the series of recessed on the pair of opposed rolls at the first stage is one of the features of this invention, because the rolls of a very large diameter at the first stage is no longer required.

In order to adjust the gap between opposed rolls, one roll is rotatably secured to a fixed support while the other roll is displaceably mounted. It is undertsood that if a coarser granule of coffee bean is desired, a corresponding gap may be provided with the opposing rolls. In general, a coffee or other food product of the fineness desired in accordance with my invention depends primarily upon the number of ribs per unit length, and secondarily, upon the extent of gap between the opposing granulating rolls.

Figure 5:
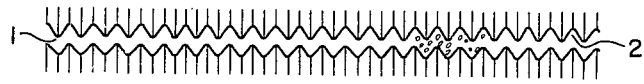
FIG. 5 is a similar view to FIG. 4 showing a second stage.
Figure 6:
FIG. 6 is a similar view to FIG. 4 showing a third stage.

Such being the construction, when a coffee bean spans as a bridge between the round edges of at least two ribs or more than two ribs of oppositely driven rolls at the same speed as it is fed from a hopper above, it is divided by the round edge of a rib with neither friction nor impact nor static electricity, in which the coffee bean is divided along the boundary or boundaries of cell or cells by distortion imparted thereto. As shown in FIGS. 4–6, the first stage granulating rolls are the most coarse, the second stage rolls are the medium, and the last stage rolls are the fineness desired. Coffee beans granulated by the first stage granulating step are now fed to the second stage step and then to the final stage step.

Figure 1:
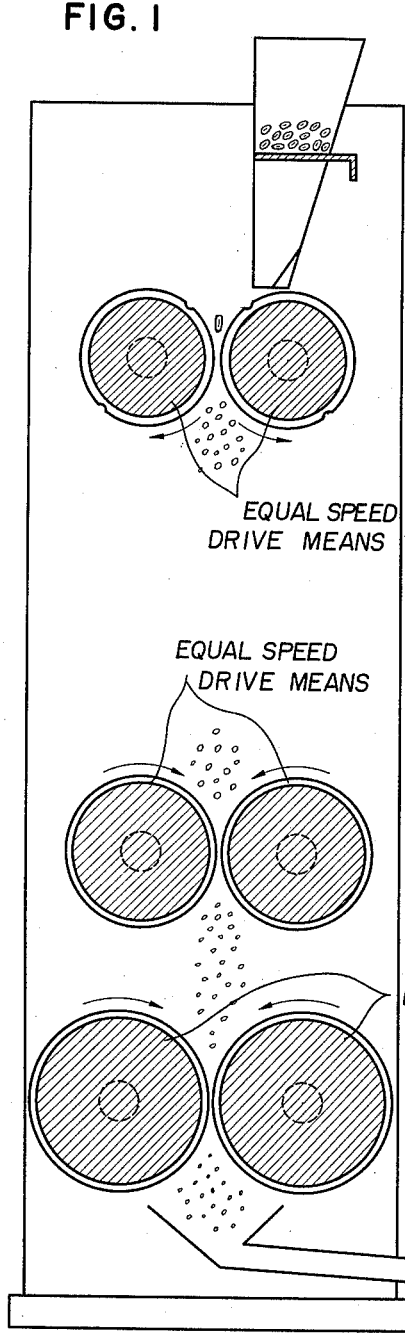
FIG. 1 is a schematic side view of the apparatus for carrying out a preferred embodiment of the invention.

As shown in FIG. 1, the coffee or other food granulating apparatus of my invention includes the first, second and last granulating means, all of which being a pair of opposed circumferentially ribbed rolls, and besides, a housing H is provided to house the above three stages granulating means. A discharge outlet D is also provided therefor. A suitable squal speed driving means for driving the granulating means is provided, too.

An example is described hereinbelow.

In general, the coffee bean is about 10–12 mm. in length, about 7–8 mm. in width and about 4–5 mm. in thickness. The gap between the edges of opposing ribs of the first stage rolls is 3 mm. Then, the space between the opposing rolls is a sum of 3 mm. and the depth of the rib. When a bean 3 passes through the space between the oppositely driven rolls at the same speed, it is subjected to Kasai as shown in FIGS. 3–4 to be turned into granulated pieces 4, one of them about 1 mm. thick. The gap between the edges of opposing ribs of the second stage is 0.9 mm. At the third stage rolls, a pitch of ribs is 0.9 mm. and the gap 0.6 mm. In this case, the revolving speed of the rolls per minute is 175 r.p.m. at the first stage, 350 r.p.m. at the second stage, and 700 r.p.m. at the last stage.

The coffee product thus produced in the above example has a fineness range of 26–30 mesh per 30 mm. with a minimum of other particles above or below adapted for the drip method.

As the edge or point of the rib of the roll is round and non-sharp as described hereinbefore, the coffee bean will be neither cut nor destroyed by it. The bean is divided into a number of small pieces through the boundary of cells by distortion imparted thereto. In this event, it has been found that neither cell is cut nor destroyed and besides, neither friction nor impact takes place during the granulating operation. One reason for the above may be given by the fact that an amount of coffee beans processed by this invention will have a volume larger than the same amount ground by a known mill, that is, an ordinary one pound can is not sufficient to pack the same weight of coffee processed by this invention.

My invention has an advantage that no sieves are required to obtain the finished coffee product with the predetermined degree of uniform fineness, because very finely divided particles of coffee are hardly produced by my invention. In addition, the difficulty of removing the chaff or silver skin of a coffee bean has been overcome by my invention, because it will be easily understood from the principle of my invention that the silver skin which is soft and light will not be cracked by a series of granulating process of my invention with the result that it remains on the product as such and easily removed by air blowing thereto.

Referring more particularly to the Kasai process by which a coffee bean is divided into 500 granules or more adapted for the drip method without friction or impact, it will be again described in more detail hereinbelow.

Figures 7, 8, 9:
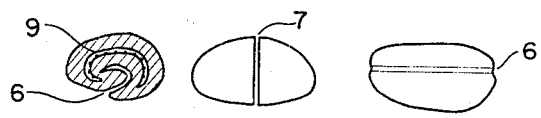
FIG. 7 is a plan view of a coffee bean showing its smaller segment form.
FIG. 8 is a similar view to FIG. 7 showing its larger segment form.
FIG. 9 is a section of FIG. 8.

As is known, the roasted coffee bean loses its weight by 10–11%, but increases its volume by 60–65%, the reasons for which are: (1) the loss of weight is caused by evaporation of water content; (2) the increase of volume is brought about by the more complicated phenomena: the moisture included in the bean is swollen by heat due to roast to expand the bean itself and then distilled off. When the bean is cooled, the whole bean is not allowed to constrict itself, because it begins to harden from the outer skin thereof. Nevertheless, the inner cells can constrict themselves because they have viscosity resulting from the remaining water and oily substances so that the bond between cells will become loose. Further, as shown in FIG. 9, a space is formed around the silver skin 6 and a narrow crevice 9 is also fromed around the center of the bean when it is constricted.

Accordingly, an approximate estimate of 70–75% space is made, because the bean loses its weight by 10–11% and increases its volume by 60–65%. The space around the silver skin 6 and the crevice 9 as shown in FIG. 9 will probably require 25%, so the remaining 45–50% may be found among the cells, for they have shrunk and not bound themselves together closely.

Next, a point of application of force in the Kasai method is described. This point of application of force is hard and smooth as mentioned hereinbefore, so it is unable to cut or destroy the food stock. As the food stock is dry or roasted to dryness without viscosity, a knife can cut if off into two pieces, but a number of pieces cannot be obtained. When a roasted coffee bean in which the bond between cells has been loosened is subjected to the Kasai method, it is easily separated into a number of pieces. This is clearly shown in FIG. 4, because the same force is applied on the bean simultaneously from both sides thereof. In practice, the roasted coffee bean is separated into an unexpectedly large number of pieces or granules. This is explained in connection with FIG. 9 in which there are shown a space around the silver skin 6 and a very narrow crevice 9 at the center of the bean. This crevice 9 depends on the extent and degree of roasting, and can be seen clearly when the bean is highly roasted. It seems that when the roasted bean is cooled, its outer skin becomes hard, then the portion facing the space around the silver skin becomes hard, which results in the formation of the crevice 9 caused by hardening and shrinking of the inner and outer skins, because there remains a very small amount of water in the deepest core of the berry.

It seems that a raw coffee bean is a 2-layer ball around the silver skin, but a roasted coffee bean becomes a 4-layer one resulting from constriction after roasting. This 4-layer ball structure of bean is easily divided into a number of pieces or granules by a relatively weak force. It has been found that the granulating force is unexpectedly small compared to the force of mill of prior art. In practice, in operation of my granulating apparatus, it consumes electric power 4.2 amp. while 4 amp. for idle operation without food stock in a 3 horsepower mill, which means that it consumes 0.2 amp. only for actual granulation. Nevertheless, the efficiency of my granulating apparatus is unexpectedly high. For the determination of efficiency, a standard efficiency will be specified as follows:

(Surface Area of All Rolls) × (Rotation Per Minute) = Total Surface Area (Total Surface Area)/(Surface Area of Bean) = Number of Beans (Number of Beans) × (Mean Weight of One Bean) = W One half of W will be specified as Standard Efficiency.

In reference to "mean weight of one bean," the mean weight of an individual bean per 1000 ones has been determined.

A granulating machine of my invention now in actual operation can produce coffee granules 7 kg. per minute, and another one 2 kg. per minute.

Another example for the manufacture of another granular food of high quality will be described in connection with the manufacture of garlic granules. Dry garlic stock dried to the extent of 8% water is subjected to the Kasai method to obtain garlic granules of less than 26 mesh per 30 mm. It is easier to make garlic granules than coffee ones. It has been found that the garlic granules thus produced will neither discolor nor be denatured for an extended period of time. It is known that the garlic powder of prior art will turn a light orange color in course of time. It seems the above difference will be ascribed to the fact that neither electric charge nor destruction of cells has ever occurred in the Kasai method. In reference to enzymes, which are considered to be greatly related to aroma, flavor and taste of coffee, a brief sketch is made hereinbelow. Enzymes are present in all living things, and all activity of living things depends on them. Enzymes play the supreme role in all life processes. In the human body, more than 650 different enzymes are known and many more will be discovered. In the plants, too, many enzymes are known. Each enzyme is specific in its action and it usually acts on only one substance. Enzymes act when they are given water at an appropriate temperature. This temperature depends on species. When a plant seed buds, it seems many enzymes act together. This applies to a living seed. How are enzymes in a dead seed? It seems they are not active in a cell, but never lose activity. For example, wheat flour produced by the common mill contains numerous cells destroyed and also enzymes come out therefrom. However, macaroni flour has maltose value index 0 while other flours maltose value index 200–300. The macaroni flour is the one separated from other flours. The maltose value is considered as an index for saccharification resulting from destroyed cells of wheat in which enzymes come out therefrom.

Another example: When living soya beans and dead soya beans are dipped in water, the living ones absorb water and expand by the action of enzymes in cells, but the dead ones never do. The above examples show that enzymes never act in the dead cells while enzymes which come out of the dead cells are active.

Coffee beans are roasted at elevated temperatures, but the enzymes in the cells never lose activity. They are not active in the cells, but active in the outside of cells with water at a suitable temperature. It is well known that the coffee drink made from the fine grind is of high flavor, but, on cooling, loses its flavor very soon while the drink made from the coarse grind is relatively weak, but lasts longer than the former in losing its flavor. The reason for the above is explained as follows: the coffee of fine grind is made by a large force of friction, therefore the cells are considerably destroyed and enzymes comes out therefrom. On the contrary, the coffee of coarse grind is made by a much smaller force of friction, therefore less enzymes come out of the cells resulting from the destruction thereof. It follows from the above that the coffee drink containing more enzymes is much more influenced than that containing less enzymes in losing its aroma, flavor and taste as time goes by. It is also well known among coffee tenders that in making a coffee drink from the drip method, if the coffee powder is agitated on the way, then hot water is again poured, the resulting drink is unexpectedly too bad to taste it. The reason is not clear.

If cells are not destroyed at all, enzymes are not mixed in the coffee drink, so it is easy to extract its taste and flavor. The enzymes which impart some effect to the essence of coffee, such as, aroma, flavor and taste, should be present in a coffee cell. Aroma molecules are also present in the cell. When the coffee bean is roasted, the aroma molecules issue from the cell. However, enzymes are not evaporated so that they cannot escape from the cells. The coffee enzymes, however, are not active either at a temperature higher than 75° C., or lower than 10° C. As is usual with the hot water extraction of coffee, the aroma essence will escape from the cell and be dissolved in water.

During the extraction period of coffee with hot water, enzymes are not active because they are inhibited by the elevated temperatures. As they are not evaporated, they are unable to escape from the cells. Since they cannot escape from the cells, they are not mixed or dissolved in the hot water. Accordingly, the problem of a good coffee has been solved by the Kasai method with neither friction nor destruction of cells whatever. By this Kasai method, three chief difficulties, electric charge, destruction of cells, and evolution of heat, have been all simultaneously overcome to obtain a clear coffee drink of high flavor in which neither oxidation nor abnormal dissolution nor conversion caused by enzymes takes place.

The action of enzymes on roasted coffee and drink in connection with the table will be described hereinbelow.

Coffee beans are roasted around 200° C. for a period of 12 minutes to be called "light roast." As roast advances further, it is called "high roast," with black and brown in halves. The enzymes in cells of a high roast coffee will not lose activity. In case the high roasted coffee beans contain 80% black and 20% brown ones, enzymes lose activity completely with the result that the coffee drink loses aroma and flavor almost entirely with a burning odor. However, this drink is so clear that it will never become turbid even at lower temperatures. As shown in the table showing coffee extract test, the values described in B columns in either coffee mill or Kasai are almost similar. This test was conducted on May 30, 1963: cloudy, 18° C. Full mark is 100 and the marks are to be agreed by four examiners.

TABLE

Coffee: Mix of Moca and Colombia Degree of Roast:
A: light roast, brown, 30 mesh
B: high roast, black, 30 mesh
C: light roast, brown, 26 mesh

|  | Known Coffee Mill | | | Kasai Method (Present Invention) | | |
| --- | --- | --- | --- | --- | --- | --- |
|  | A | B | C | A | B | C |
| Cof. Quant., g | 30 | 30 | 30 | 30 | 30 | 30 |
| Hot W. Quant., l | 0.5 | 0.5 | 0.5 | 0.5 | 0.5 | 0.5 |
| Liq. Temp. after Ext., °C | 73 | 73 | 72 | 72 | 72 | 73 |
| Deg. of Clear | Worse 90 | 100 | 100 | 100 | 100 | 100 |
| Taste | Compl. 90 | 20 | Refr. 100 | Refr. 100 | 20 | Refr. 100 |
| Aroma | 90 | Burn. Od. | 100 | 100 | Burn. Od. | 100 |
| Temp., 55° C.: |  |  |  |  |  |  |
| Clear | 50 | 100 | 100 | 100 | 100 | 100 |
| Taste | 50 | 20 | 80 | 100 | 20 | 100 |
| Aroma | 50 | Burn. Od. | 80 | 100 | Burn. Od. | 100 |
| Temp., 30° C.: |  |  |  |  |  |  |
| Clear | 0 | 100 | 80 | 100 | 100 | 100 |
| Taste | 0 | 20 | 50 | 100 | 20 | 100 |
| Aroma | 0 | Burn. Od. | 50 | 100 | Burn. Od. | 100 |
| Temp., 20° C.: |  |  |  |  |  |  |
| Clear | 0 | 100 | 70 | 100 | 100 | 100 |
| Taste | 0 | 10 | 40 | 100 | 10 | 100 |
| Aroma | 0 | Burn. Od. | 40 | 90 | Burn. Od. | 90 |
| 5 hrs. later: |  |  |  |  |  |  |
| Clear | 0 | 100 | 70 | 100 | 100 | 100 |
| Taste | 0 | 0 | 0 | 50 | 0 | 50 |
| Aroma | 0 | Burn. Od. | 0 | 50 | Burn. Od. | 50 |
| 1 month later: |  |  |  |  |  |  |
| Clear | 0 | 90 | 50 | 90 | 90 | 90 |
| Taste | 0 | 15 | 0 | 90 | 15 | 90 |
| Aroma | 0 | Burn. Od. | 0 | 90 | Burn. Od. | 90 |

Note.—Burn. Od.: burning odor; Refr.: refreshing; Cof. Quant.: coffee quantity; W.: water; Liq.: liquid; Temp.: temperature; Ext.: extraction; Deg. of Clear.: degree of clearness.

Those skilled in the coffee art have heretofore discussed that the change and fall of flavor of coffee are due to oxidation and fat. It seems oxidation proceeds as time passes. It seems difficult to ascertain the change of coffee flavor due to oxidation in the hot coffee drink which has just been extracted from the coffee of the known coffee mill. However, it is very easy to recognize the above change of flavor of coffee drink after 24 hours, and more noticeable after 4 days.

It is thought that the invention and many of its attendant advantages will be understood from the foregoing description, and it will be apparent that various changes may be made in the form, construction and arrangement of the parts without departing from the spirit and scope of the invention, the form hereinbefore described being merely a preferred embodiment thereof.

I claim:

An apparatus for granulating a dry food stock, comprising a pair of opposing granulating rolls, each of said granulating rolls being provided with a plurality of ribs on the surface thereof all extending in the direction in which the rolls move where they oppose each other, each of said ribs being covered with a hard and smooth top made of a dielectric material, each of said ribs being provided with a plurality of recesses extending in an axial direction with respect to the shaft of said roll and the dimension of said rib in the direction toward the opposed ribs being smaller than each grain of said food stock prior to granulating, and means connected to said granulating rolls for moving said rolls at the same speed in opposite directions, whereby the food stock is subjected to cracking as the grains span the ribs of the granulating rolls along the boundary of a group of cells consisting of said grain without imparting either impact or friction or cutting action to said grain and with no occurrence of static electricity and no destruction of said cells.

References Cited by the Examiner

UNITED STATES PATENTS

| 2,510,679 | 6/50 | Bruce | 99—155 |
| 2,612,083 | 9/52 | Hayes | 241—294 |
| 2,745,748 | 5/56 | McCashen | 99—93 |
| 2,781,176 | 2/57 | Clark | 241—294 |
| 3,039,704 | 6/62 | Goto | 241—159 |

J. SPENCER OVERHOLSER, *Primary Examiner.*

A. LOUIS MONACELL, *Examiner.*